Figure 6:
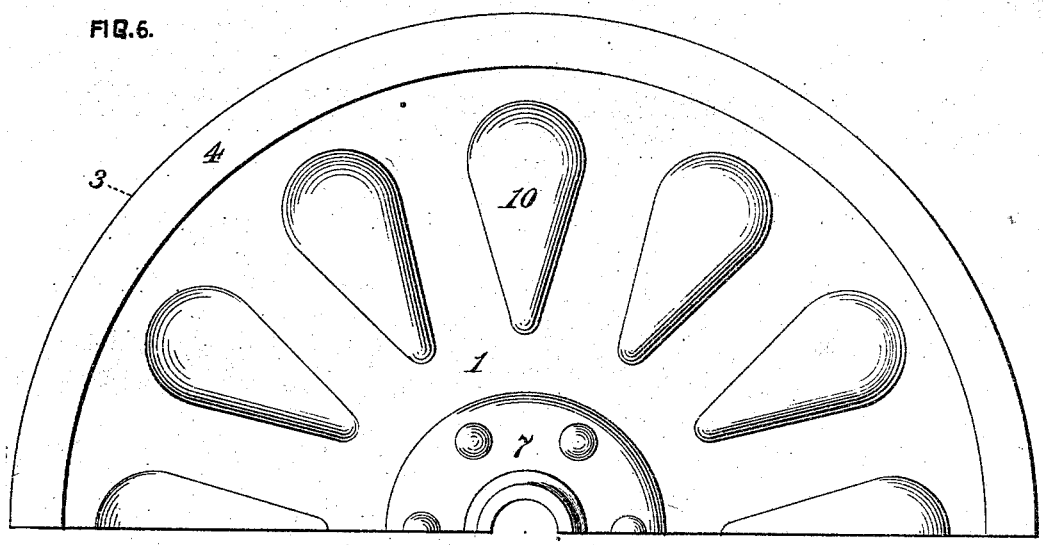

(No Model.)  5 Sheets—Sheet 1.
H. F. MANN.
CAR WHEEL.
No. 439,358. Patented Oct. 28, 1890.
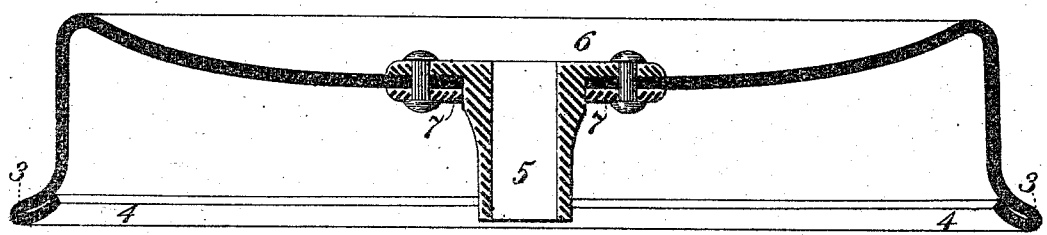
FIG. 1.
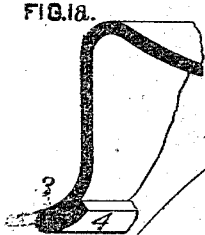
FIG. 1a.
FIG. 2.
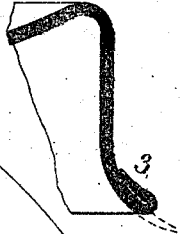
FIG. 1b.
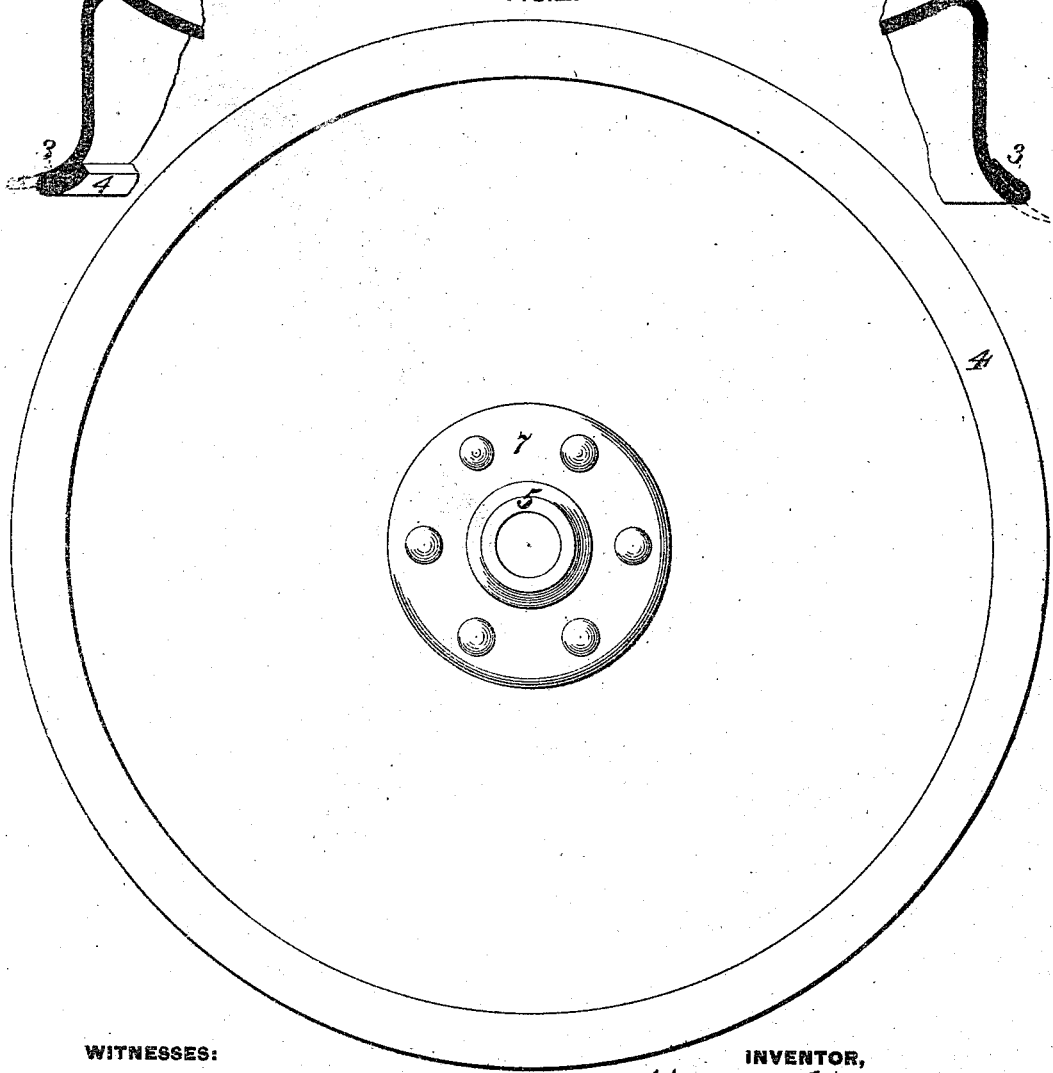
WITNESSES:
Darwin B. Wolcott
F. E. Gaither
INVENTOR,
Henry F. Mann
by George N. Christy
Att'y.

(No Model.)  H. F. MANN.  5 Sheets—Sheet 2.
CAR WHEEL.
No. 439,358.  Patented Oct. 28, 1890.
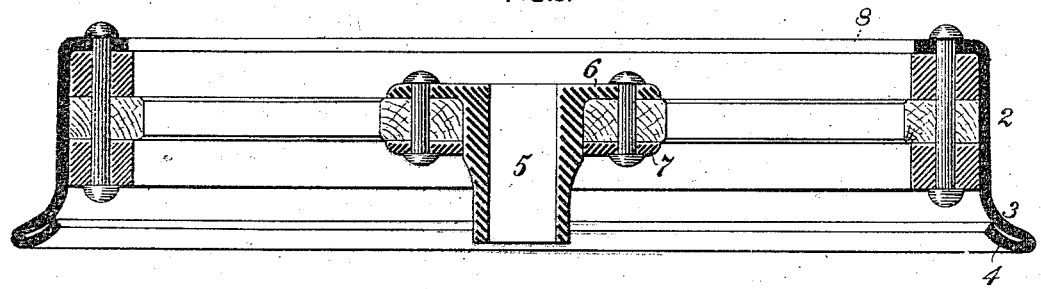
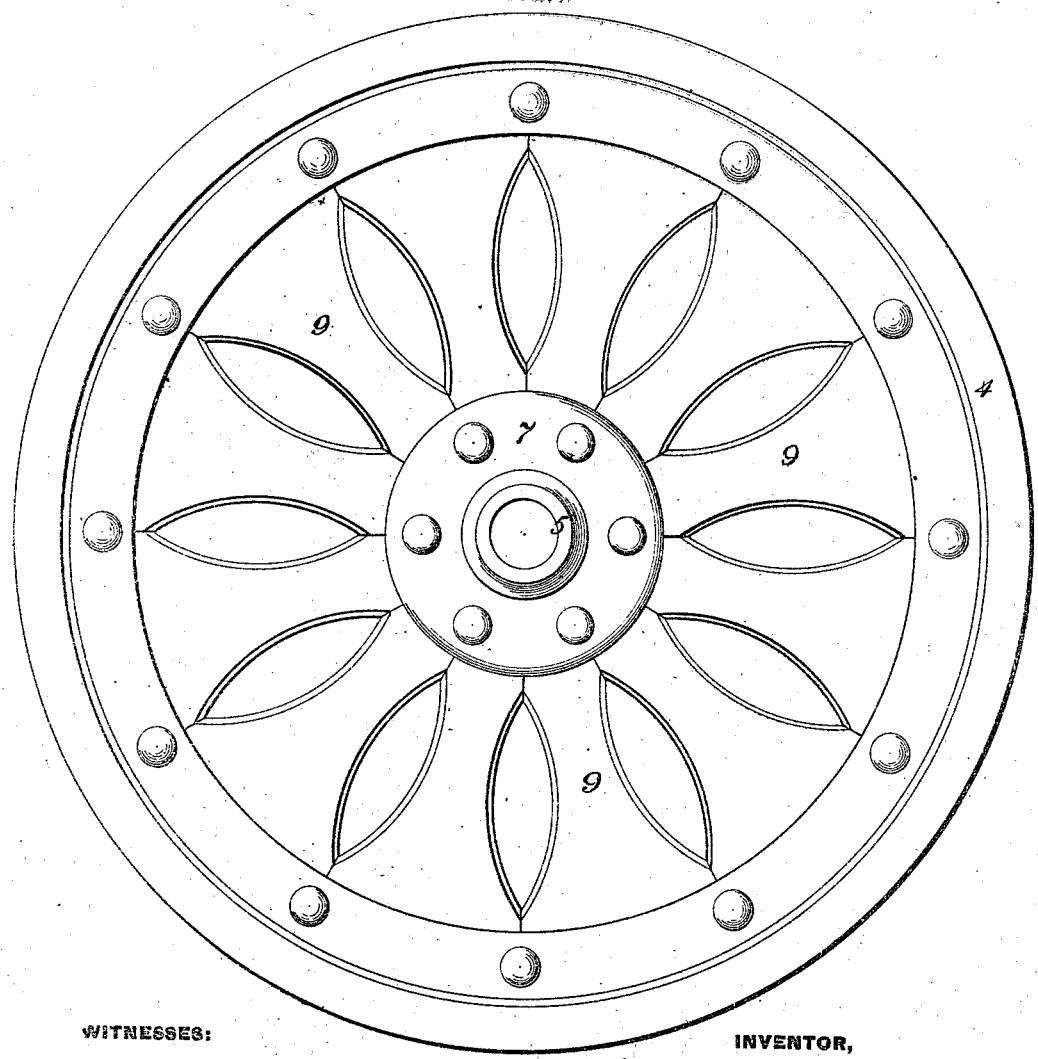

(No Model.) 5 Sheets—Sheet 3.

H. F. MANN.
CAR WHEEL.

No. 439,358. Patented Oct. 28, 1890.

WITNESSES: INVENTOR, (No Model.)  5 Sheets—Sheet 4.
H. F. MANN.
CAR WHEEL.
No. 439,358.  Patented Oct. 28, 1890.
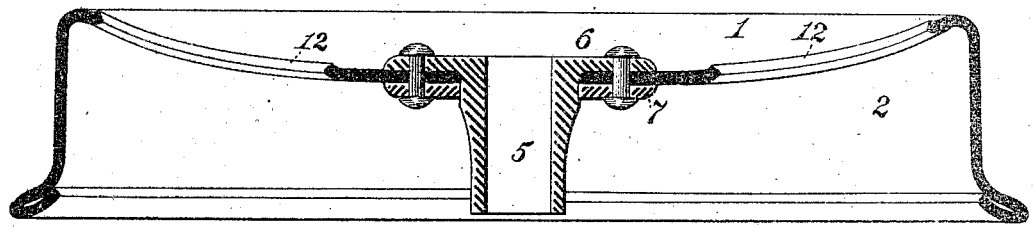
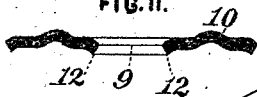
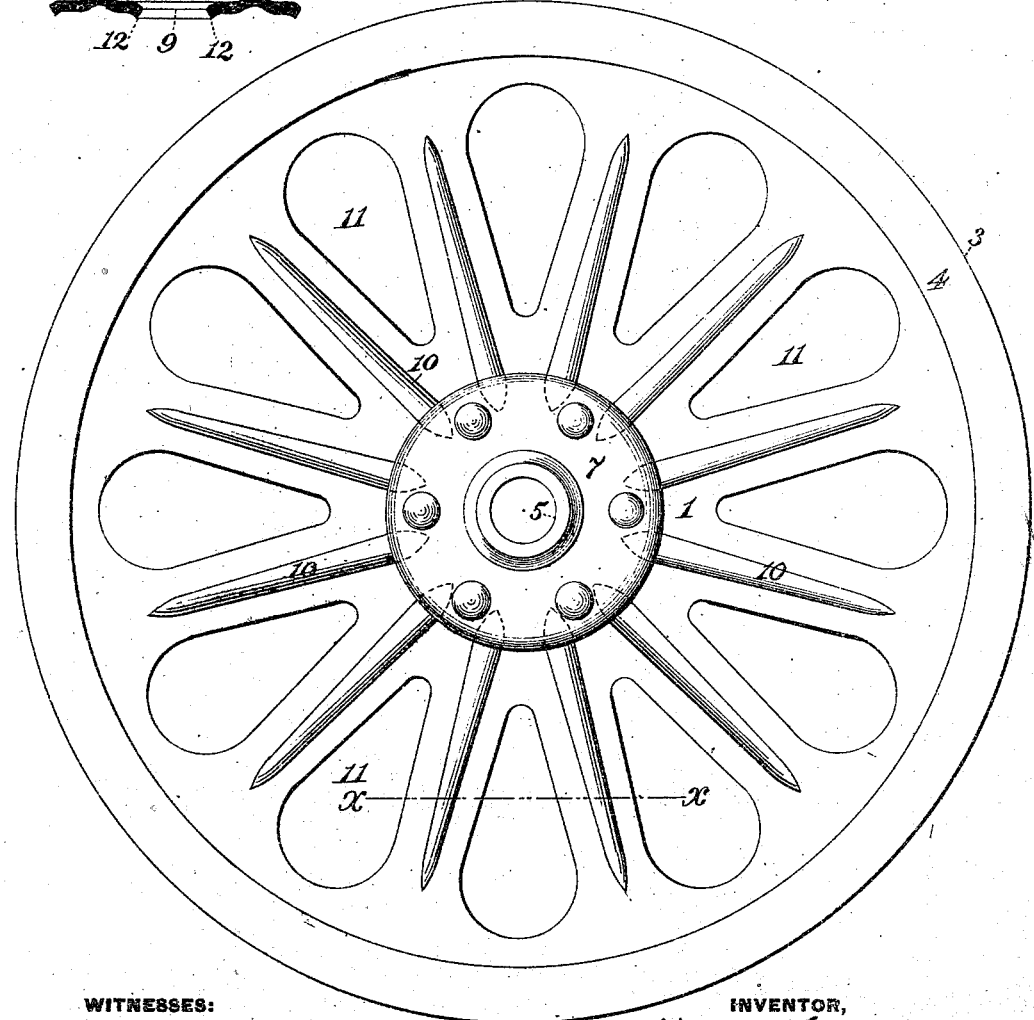
WITNESSES:
Darwin S. Wolcott
F. E. Gaither
INVENTOR,
Henry F. Mann
by George H. Christy
Att'y.

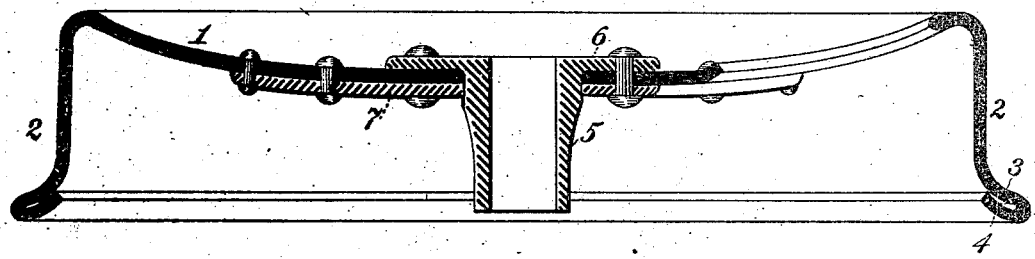
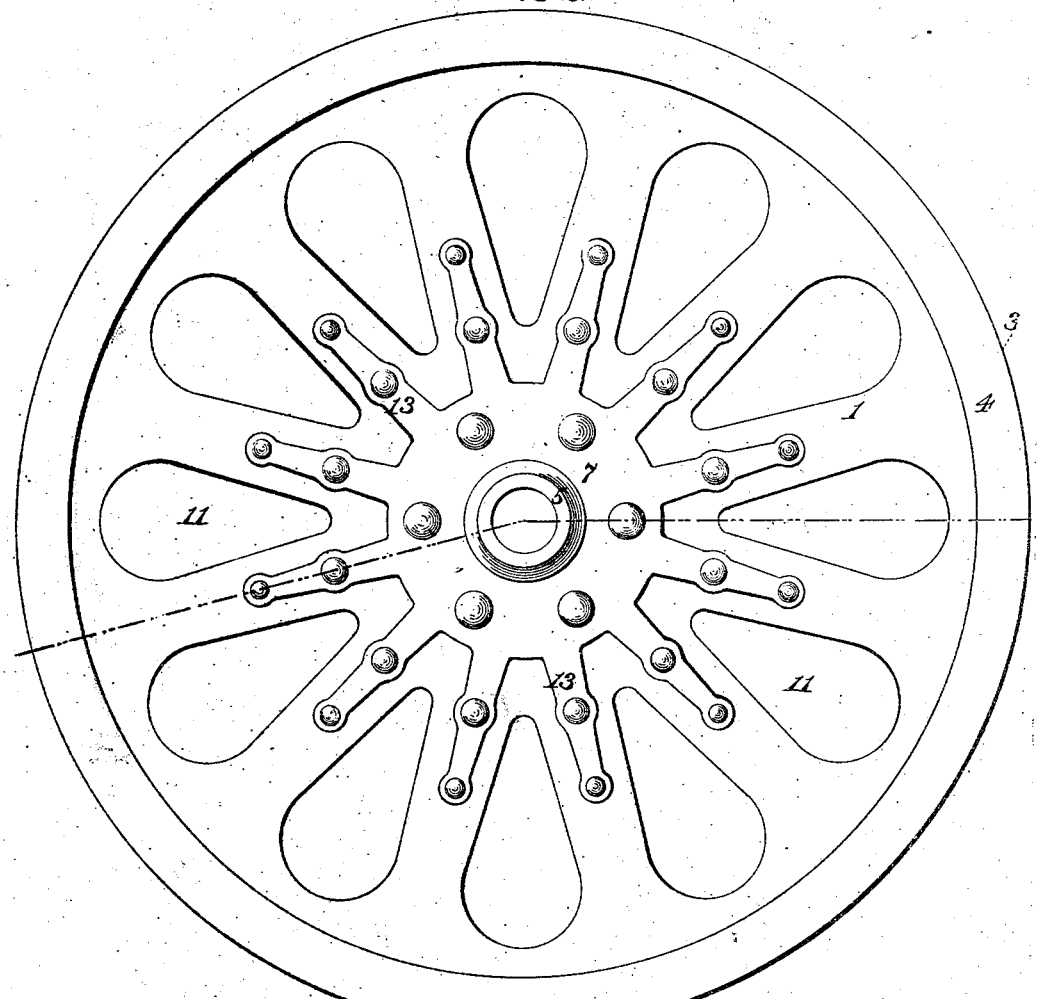

UNITED STATES PATENT OFFICE.

HENRY F. MANN, OF ALLEGHENY, PENNSYLVANIA.

CAR-WHEEL.

SPECIFICATION forming part of Letters Patent No. 439,358, dated October 28, 1890.

Application filed November 13, 1888. Serial No. 290,705. (No model.)

*To all whom it may concern:*

Be it known that I, HENRY F. MANN, a citizen of the United States, residing at Allegheny, in the county of Allegheny and State of Pennsylvania, have invented or discovered certain new and useful Improvements in Car-Wheels, of which improvements the following is a specification.

The invention described herein relates to certain improvements in the manufacture of wrought-iron or steel wheels designed for use more especially in hand-cars and railway-velocipedes and other like structures, wherein as great a reduction of weight as is compatible with strength and durability is an object of great importance. Heretofore wheels of this genus have been constructed with the flange formed of a single thickness of metal, the web being formed either of wooden spokes bearing at their outer ends along the middle portion of the tread or of a metal disk connected to or formed integral with the tread along the outer edge thereof. Wheels have also been formed with the flange formed of a double thickness of metal and with the web formed integral with the outer fold of the flange; but as the normal bearing-point of the tread upon the rail is about midway of the width of the tread, which was formed of a single thickness of metal and projected out horizontally a considerable distance from the flange, it was necessary to support the outer edge of the tread by a second web, and, further, in order to prevent any buckling of the web by the lateral blow or strains due to the striking of the flange against the rail a filling of wood or paper was placed between the two webs.

The object of the invention herein is to so construct wheels of the class above referred to that the flange shall be sufficiently strong and broad as to prevent any distortion or injury thereof and to enable it to properly perform its guiding function in passing frogs, switches, and crossings, as well as to obviate any injurious cutting or bruising of the ties or rails by the flange, and also sufficiently rigid to render unnecessary the employment of a second web or other radial brace for the flange edge of the tread, except where very heavy loads are placed upon the wheels, the outer edge of the tread being connected to or formed integral with the web, which is so constructed as to resist any buckling thereof.

Figures 5, 7:
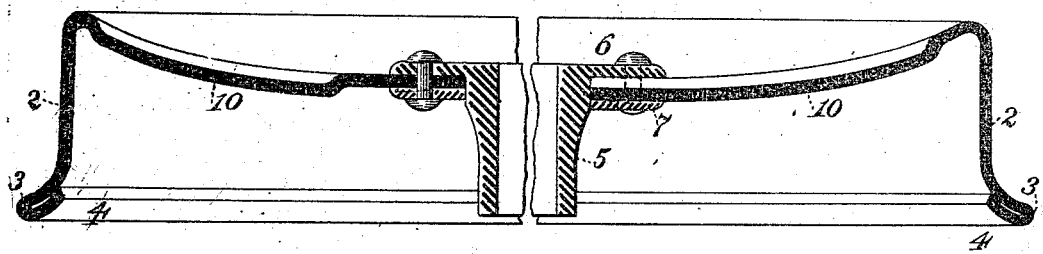
Figure 8:
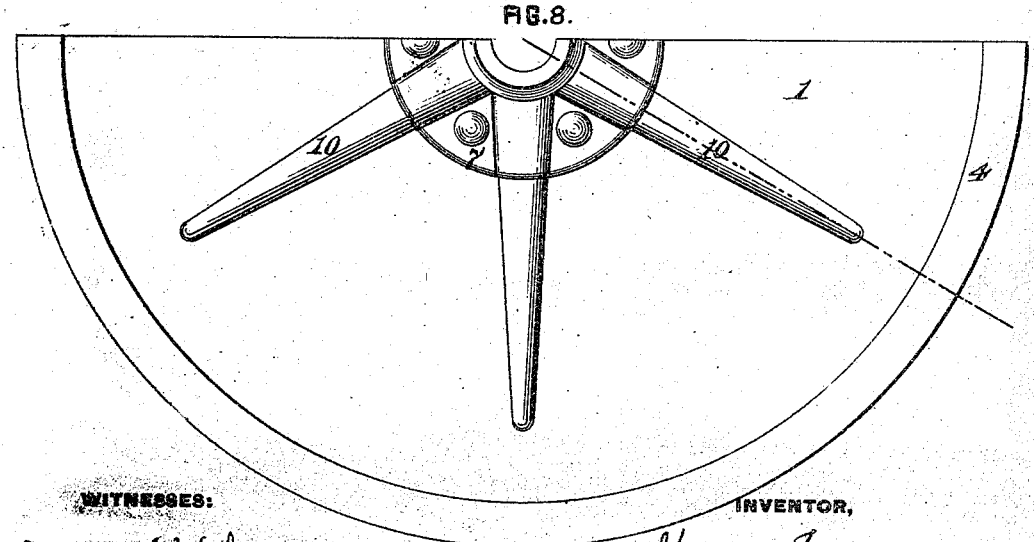

In the accompanying drawings, forming a part of this specification, Figure 1 is a sectional view of a car-wheel constructed in accordance with my invention. Figs. 1ª and 1ᵇ are detail views showing the tread and flange and illustrating different arrangements of the re-enforcing fold. Fig. 2 is a view in elevation of the rear side of the wheel. Figs. 3 and 4, Sheet 2, are similar views showing my invention applied to wheels having wooden spokes or webs. Figs. 5, 6, 7, and 8, Sheet 3, are views in section and elevation of portions of the form of wheel shown in Fig. 1, illustrating different forms of corrugations for strengthening the web. Figs. 9 and 10, Sheet 4, are views similar to Figs. 7 and 8, showing the manner of lightening the web and at the same time increasing the rigidity thereof. Fig. 11 is a sectional detail on the line $x\,x$, Fig. 10; and Figs. 12 and 13, Sheet 5, are views in section and elevation showing the web re-enforced by arms radiating from the hub.

In the practice of my invention I take a circular disk or plate of wrought iron or steel, and by means of a suitable flanging-machine or by suitable dies or other devices turn or bend the edge of the disk over at right angles, or approximately so, to the body or interior portion 1 thereof, thereby forming the tread 2 of the wheel. Simultaneously with or subsequently to the above-described flanging operation the body portion is dished, as shown, thereby bringing the center thereof nearly in line with the middle portion of the tread in the finished wheel.

In the flanging operation above described for the formation of the tread 2 a greater width of metal than is required for the tread is turned over, such excess of width being approximately equal to double the depth of flange required in the finished wheel. This excess of metal is then turned outwardly by a flanging operation similar to that employed in the formation of the tread 2 to the angle required for the flange 3 in the finished wheel. As will be readily understood from the foregoing, and as represented in Figs. 1ª and 1ᵇ, the metal turned out in the operation last described for the formation of the flange is double the width of the required flange, or nearly so. This excess of width of metal in the flange is then turned over, forming an inwardly-extending fold of metal 4, which re-enforces and braces the flange as against any lateral strains and broadens the flange to better perform its guiding function, thereby rendering it less liable to receive any injury from contact with the rails, &c., and also less liable to injure by cutting or indenting any object with which it may be brought into contact. It will also be observed that this re-enforced flange is so arranged with reference to the strains to which the wheel is normally subjected—*i. e.*, inwardly - acting strains—as to present the greatest resistance to any distortion of the wheel, and the tread being connected to the web any further support of the flange-edge of the tread to prevent distortion thereof is unnecessary, except perhaps in the case of wheels subjected to unusually heavy loads or strains.

The hub 5 has a washer 6 formed integral therewith, and the web is secured to the hub by clamping it between said washer and a removable washer 7, the washers and web being united together by bolts or rivets, as shown, or in any other convenient manner.

If desired, in lieu of forming the web integral with the tread, as shown in Figs. 1 and 2, a short flange 8 may be formed on the outer edge of the tread and be secured by suitable bolts to a series of wooden spokes, (see Figs. 3 and 4,) the latter being secured to the hub in the manner stated in connection with the integral web shown in Figs. 1 and 2. This construction forms a very strong and rigid wheel, which may be employed at times to great advantage.

In Figs. 5, 6, 7, and 8 I have illustrated different forms or shapes of corrugations 10, formed radially in the web for the purpose of increasing the rigidity and strength of the web, the corrugations in Figs. 5 and 6 being confined to the portions of the web between the washers and tread, while those shown in Figs. 7 and 8 extend from the hub radially into close proximity to the tread. If desired, the wheel may be made lighter by cutting out sections of the web between the corrugations, as shown in Figs. 9 and 10, and a greater rigidity and strength may be imparted to the web by turning out the edges of the holes 11, formed in lightening the web, as shown at 12 in Figs. 9 and 11. A corresponding re-enforcement or bracing of the web of the wheel may be effected by forming a series of radial arms 13 upon the removable washer 7, as shown in Figs. 12 and 13, said arms being secured to the webs by suitable bolts or rivets and when applied to wheels having portions of the web removed, constructed to extend some distance between the holes so formed.

The principal characteristics of my invention relate to the broadening and re-enforcement of the flange of the wheel by an inward fold of metal integral with the flange proper.

I claim herein as my invention—

1. A wrought-iron or steel car-wheel having its inner or flange edge unsupported from the hub, the flange being re-enforced by a fold of metal lying against said flange, substantially as set forth.

2. A wrought-iron or steel car-wheel having, in combination with its tread, a flange re-enforced by a fold of metal lying against said flange and an inwardly-projecting rim or flange along the outer edge of the tread, whereby said tread may be connected to the hub, substantially as set forth.

3. A wrought-iron or steel car-wheel having, in combination with its tread, a flange re-enforced by a fold of metal lying against said flange and a web formed integral with the tread along the outer edge of the latter, substantially as set forth.

4. A wrought-iron or steel car-wheel having, in combination with its tread, a flange re-enforced by a fold of metal lying against said flange and a corrugated web formed integral with the tread along the outer edge of the latter, substantially as set forth.

5. A wrought-iron or steel car-wheel having its flange re-enforced by a fold of metal lying against the outer side of said flange—*i. e.*, the side away from the tread—substantially as set forth.

In testimony whereof I have hereunto set my hand.

HENRY F. MANN.

Witnesses:
R. H. WHITTLESEY,
DARWIN S. WOLCOTT.